United States Patent [19]

Van Ee

[11] Patent Number: 5,180,342
[45] Date of Patent: Jan. 19, 1993

[54] DEVICE FOR MAINTAINING BELT ALIGNMENT

[75] Inventor: Marvin D. Van Ee, Eldridge, Iowa

[73] Assignee: Case Corporation, Racine, Wis.

[21] Appl. No.: 641,171

[22] Filed: Jan. 14, 1991

[51] Int. Cl.[5] .............................................. F16H 7/22
[52] U.S. Cl. .................................... 474/123; 474/101
[58] Field of Search ............... 474/101, 102, 105–108, 474/151, 123

[56] References Cited

U.S. PATENT DOCUMENTS

| | | | |
|---|---|---|---|
| 1,204,371 | 11/1916 | McFeely | 474/123 |
| 1,846,665 | 2/1932 | Adams | 474/107 |
| 2,344,817 | 3/1944 | Hlavaty | 474/106 |
| 2,349,084 | 5/1944 | Findley | 308/61 |
| 3,198,411 | 8/1965 | Cope | 474/102 |
| 3,251,235 | 5/1966 | Cederberg | 474/123 |
| 3,359,689 | 12/1967 | McCarty et al. | 51/170 |
| 4,092,914 | 6/1978 | Burrough et al. | 100/88 |
| 4,096,906 | 6/1978 | Bonnamour | 164/433 |
| 4,098,136 | 7/1978 | Wicker et al. | 74/242.15 R |
| 4,294,044 | 10/1981 | Hansen | 474/123 |
| 4,334,693 | 8/1982 | Hamaker | 355/3 BE |
| 4,403,454 | 9/1983 | Glore et al. | 51/135 BT |
| 4,747,810 | 5/1988 | Shepley et al. | 474/135 |

Primary Examiner—Renee S. Luebke
Assistant Examiner—F. Saether
Attorney, Agent, or Firm—Jansson & Shupe, Ltd.

[57] ABSTRACT

The inventive device includes a support shaft having a longitudinal axis with a locus that does not change, including when the shaft is positionally rotated about such axis. A collar is mounted on the shaft for supporting an idler pulley having an axis of rotation. An indexing plate is also mounted on the shaft for maintaining a selected position of the collar, the angular position of which is adjustable. An indexing surface is in position-affecting relationship to the collar and defines a plane oriented at an angle with respect to the shaft axis. This angle is adjustable for selecting the position of the collar. The device permits the locus of the axis of rotation of the idler pulley to be selected to maintain alignment of a belt with a driving pulley, thereby preventing such belt from becoming disengaged from the driving pulley.

17 Claims, 4 Drawing Sheets

DEVICE FOR MAINTAINING BELT ALIGNMENT

FIELD OF THE INVENTION

This invention is related generally to devices for maintaining the alignment of drive belts and, more particularly, to a device for positionally adjusting the axis of rotation of an idler pulley so that alignment of the belt to a drive pulley may be maintained.

BACKGROUND OF THE INVENTION

Mechanical power transmission by using driving and driven pulleys with a connecting belt has long been known. A variation in this basic arrangement involves an idler pulley for supporting the belt, notwithstanding that the position of the belt may change slightly during operation of the drive.

An example of an idler pulley arrangement is shown in Shepley et al. U.S. Pat. No. 4,747,810. The Shepley arrangement mounts a pulley for rotation about a shaft. A spherical bearing is interposed between the shaft and the pulley and permits the axis of rotation of the pulley to change locus slightly, thereby permitting the pulley to responsively align its face to the orientation of a belt. That is, the pulley does not function to maintain belt alignment but rather, responds to changes in belt position and continues to support the belt in spite of such changes.

A similar arrangement is shown in Wicker et al. U.S. Pat. No. 4,098,136. In certain of the Wicker et al. arrangement, the idler pulley is mounted for rotation on a support shaft which in turn is mounted to a lever by a ball-shaped section. The ball-shaped section permits the axis of rotation of the pulley and the longitudinal axis of the support shaft (which are coincident) to be angularly changed slightly with respect to an axis of the lever. A set screw maintains the selected position. In other arrangements, the pulley rotation axis and support shaft axis can be angularly changed with respect to one another.

Yet another such arrangement is shown in Findley U.S. Pat. No. 2,349,084. In the Findley arrangement, a pulley is supported for rotation upon a support shaft, the axes of the support shaft and of pulley rotation being coincident with one another. The position of the axis may be adjusted in small increments using a pair of convex seats which are maintained in a clamped position by a bracket.

Other arrangements for affecting the position of a rotating member, e.g., an elongate roller or a pulley, are shown in McCarty et al. U.S. Pat. No. 3,359,689; Burrough et al. U.S. Pat. No. 4,092,914; Bonnamour U.S. Pat. No. 4,096,906; Glore et al. U.S. Pat. No. 4,403,454 and Hamacker U.S. Pat. No. 4,344,693.

Certain of the devices shown in the foregoing patents share common characteristics. For example, the devices shown in the McCarty et al., Burrough et al., Findley, Bonnamour, Hamacker and Glore et al. patents, and certain of those shown in the Wicker et al. patent are constructed so that the axis of the support shaft and the axis of rotation of the pulley or roller are at a locus coincident with one another for all angular positions of the pulley or roller. To put it another way, the axes of rotation and of the support shaft cannot be angularly adjusted with respect to one another.

While the device shown in the Shepley et al. patent permits the axis of the support shaft and the axis of pulley rotation to be separately positioned with respect to one another, the Shepley et al. device merely responsively self aligns to conform to irregularities in the belt. That is, the loci of the support shaft and of the pulley axis of rotation continually change during operation and may not be maintained in a fixed angular relationship.

In addition, the devices shown in the foregoing patents require a large number of parts to effect position changes in the axis of rotation of the pulley or roller.

An improved device which may be positioned to actively maintain alignment of a belt, which permits the locus of the pulley axis of rotation to be adjusted with respect to the locus of the support axis and which employs a minimum number of parts to effect changes in the locus of such axis of rotation would be an important advance in the art.

OBJECTS OF THE INVENTION

It is an object of this invention to overcome some of the problems and shortcomings of the prior art.

Another object of this invention is to provide an improved device wherein the locus of the axis of rotation of an idler pulley may be angularly changed with respect to the locus of the axis of the support shaft for maintaining belt alignment.

Another object of this invention is to provide an improved device for maintaining belt alignment which includes an indexing surface in position-affecting relationship to a collar which supports the idler pulley.

Yet another object of this invention is to provide an improved device for maintaining belt alignment which includes a support shaft and an indexing plate mounted on the shaft for maintaining a selected angular position of a collar which supports an idler pulley.

Another object of this invention is to provide an improved device for maintaining belt alignment wherein the position of an idler pulley may be selected to guide a belt into aligned engagement with a drive pulley.

Still another object of this invention is to provide an improved device for maintaining belt alignment wherein the belt and the driving and driven pulleys are complementarily grooved.

These and other important objects will be apparent from the descriptions of this invention which follow.

SUMMARY OF THE INVENTION

The improved device is used for maintaining alignment of a belt passing over an idler pulley and driven by a drive pulley. In certain drive situations, namely pulley and belt reversal, the inventive device helps prevent the belt from "jumping off" of the drive pulley. The device is particularly useful with drive pulleys and belts having complementary "V" or grooved faces.

By way of brief explanation, the device supports the idler pulley in a way that the angular orientation of the pulley can be changed slightly to urge the belt into an aligned location with respect to the driving pulley. It does so by using an indexing surface which is slightly "off-normal" to the axis of the support shaft by a few degrees. By selectively positioning the support shaft and, simultaneously, the indexing surface, the idler pulley may be caused to urge the belt in a particular direction.

The device includes a support shaft having a longitudinal axis with a locus that does not change, including when the shaft is positionally rotated about such axis. A collar is mounted on the shaft for supporting an idler pulley having an axis of rotation. An indexing plate is also mounted on the shaft for maintaining a selected position of the collar, the angular position of which is adjustable. An indexing surface is in position-affecting relationship to the collar and defines a plane oriented at an angle with respect to the shaft axis. This angle is adjustable for selecting the position of the collar. The device permits the locus of the axis of rotation of the idler pulley to be selected to maintain alignment of a belt with a drive pulley, thereby preventing such belt from becoming disengaged from the drive pulley.

The indexing surface can be any of several surfaces. For example, it can be the inner face of the collar. In such instance, the opening through the collar and the cross-sectional shape of the support shaft are formed to a complementary torque-transmitting shape. In this way, rotating the support shaft will also change the position of the indexing surface and therefore, of the pulley.

The indexing surface can also be the inner or outer face of the indexing plate. In that instance, the opening through the indexing plate and the cross-sectional shape of the support shaft are formed to a complementary torque-transmitting shape. Irrespective of indexing surface location as described above, such surface and the axis of rotation of the pulley define a generally right angle irrespective of the locus of such axis of rotation.

As to the collar, the idler pulley is supported for rotation by a bearing having an inner race and in one embodiment, the inner race forms the collar. In another embodiment, the collar is embodied as a sleeve interposed between the inner race and the support shaft.

In a preferred embodiment, the support shaft is a bolt having a flat surface formed along a portion of its length to provide a torque-transmitting cross-sectional shape. Further, the indexing plate has a generally circular perimeter and includes an opening therethrough, the shape of which is generally complementary to the cross-sectional shape of the bolt. The indexing plate further includes an inner face and an outer face, both of which are generally planar and define a relatively small included angle therebetween. One of these faces is the indexing surface and the other face is generally normal to the locus of the axis of rotation of the idler pulley.

As described in greater detail below, that face which constitutes the indexing surface is generally flat so that the locus of the axis of rotation of the idler pulley may be selected in a continuum rather than in discrete steps.

DETAILED DESCRIPTION OF PREFERRED EMBODIMENTS

The FIGURES show the improved device 10 in accordance with the invention.

Figure 1:
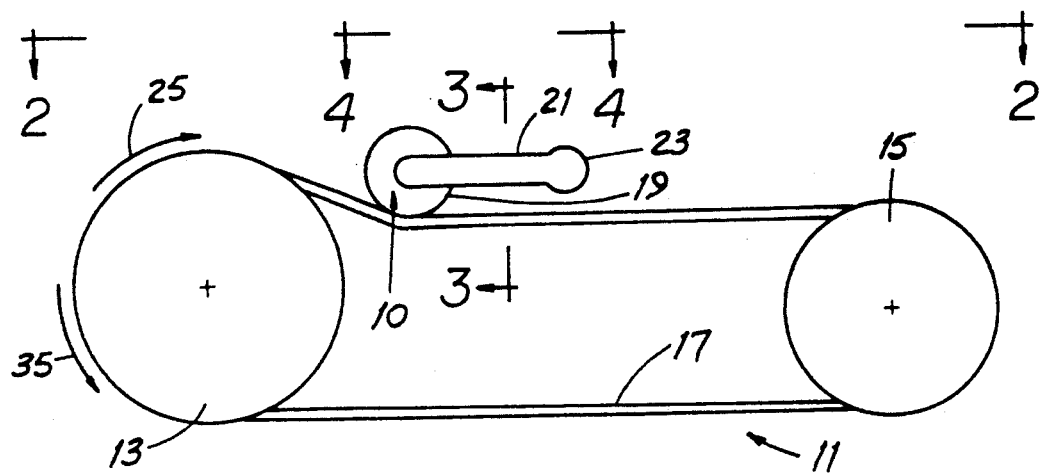
FIG. 1 is a side elevation view of a belt drive arrangement shown with an idler pulley.

Referring first to FIG. 1, the improved device 10 is shown in connection with a mechanical power transmission arrangement 11 having a driving pulley 13, a driven pulley 15 and a belt 17 passing therebetween for transmitting rotational power from the pulley 13 to the pulley 15. Such arrangements may be found in a wide variety of applications including but not limited to applications involving agricultural combines. The belt 17 and the pulleys 13, 15 are complementarily grooved with two or more lands and grooves each, all in a known manner. An idler pulley 19 is supported for rotation on a movable idler arm 21, the outer end 23 of which is pinned for pivoting movement. The magnitude of force at which the idler pulley 19 bears against the belt 17 is adjustable (for belt tension adjustment purposes) and is maintained by a yoke or adjusting bracket (not shown) in a known manner.

Figure 2:
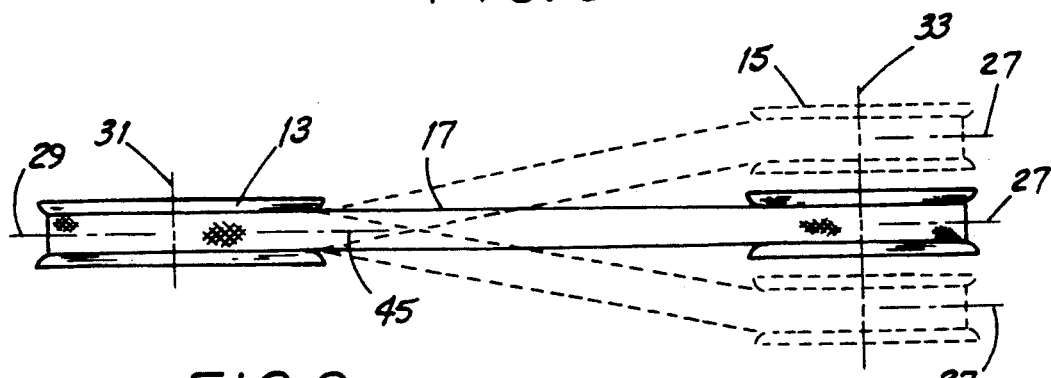
FIG. 2 is a top plan view of the arrangement shown in FIG. 1, taken along the viewing plane 2—2 thereof, with idler pulley omitted and with alternate locations of other parts shown in dotted outline.

Referring additionally to FIG. 2, when the belt 17 is moving in the direction of the arrow 25, there is sufficient distance between the idler pulley 19 and the driven pulley 15 to permit the belt 17 to self-align with and engage the driven pulley 15. This is so notwithstanding that the plane 27 defined by the driven pulley 15 may be slightly laterally offset from the plane 29 defined by the driving pulley 13. Offset may be to either side, i.e., up or down as shown in the exaggerated dotted outlines of FIG. 2. In addition to or in lieu of pulley offset as shown, the rotational axes 31, 33 of the pulleys 13, 15, respectively, may not be parallel and that may also contribute to belt misalignment.

When the driven pulley 15 is connected to a machine component (not shown) which becomes jammed, it is necessary to reverse the direction of the belt 17 and the pulleys 13, 15 to remove the obstruction. In such instance, the belt 17 moves in the direction shown by the arrow 35. During such "reverse" movement, the distance between the idler pulley 19 and the driving pulley 13 is relatively small. It has been found that a slight lateral displacement of the belt 17 as shown in either dotted outline of FIG. 2 will cause the lands of the belt 17 to "jump" out of the corresponding groove in the driving pulley 13. Perhaps the least serious result of such eventuality is that the belt 17 may be damaged or ruined. In a more extreme case, the driving pulley 13 and other drive mechanism may also be ruined.

In view of the foregoing, it is highly desirable to guide and align the belt 17 to the driving pulley 13 when the drive is reversed and the belt 17 moving in the direction shown by the arrow 35.

Figure 3A:
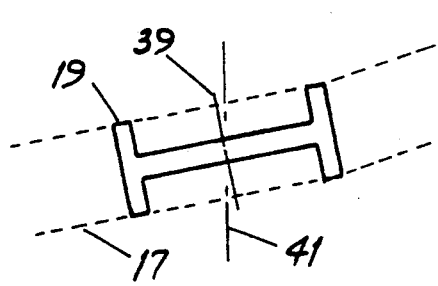
FIG. 3A is a simplified view of the idler pulley, taken along the viewing plane 4—4 of FIG. 1, showing the pulley in guiding relationship to a belt and in one extreme pulley position, with part in dashed outline.
Figure 3B:
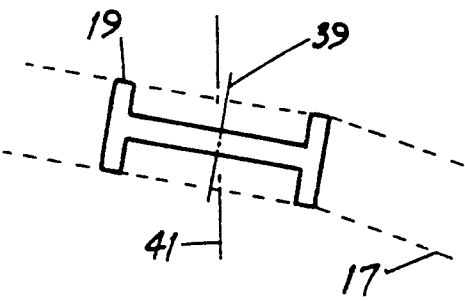
FIG. 3B is another simplified view of the idler pulley, taken along the viewing plane 4—4 of FIG. 1, showing the pulley in guiding relationship to a belt and in another extreme pulley position, with part in dashed outline.

Referring to FIGS. 3A and 3B, the improved device 10 accomplishes this result by permitting the locus of the axis of rotation 39 of the idler pulley 19 to be changed slightly with respect to the first axis 41 of the support shaft 43. Depending on the direction of change, the belt 17 is urged in one direction or the other. As shown in FIG. 3A, the position of the axis of rotation 39 of the idler pulley 19 would be selected as shown in the event the driven pulley 15 is displaced upward to the position shown in FIG. 2. On the other hand, the locus of the axis of rotation 39 of the idler pulley 19 would be selected as shown in FIG. 3B when the driven pulley 15 is slightly offset downward to the position shown in FIG. 2. In either instance, friction between the pulley 19 and the top surface of the belt 17 permits the pulley 19 to slightly "turn" the belt 17 to generally align with the pulley 13.

Stated another way, changing the locus of the axis of rotation 39 of the idler pulley 19 serves to substantially align the center line 45 of the belt 17 with the plane 29 defined by the driving pulley 13 as the belt 17 engages the pulley 13. Additional details of the improved device 10 are set forth below.

Figure 4:
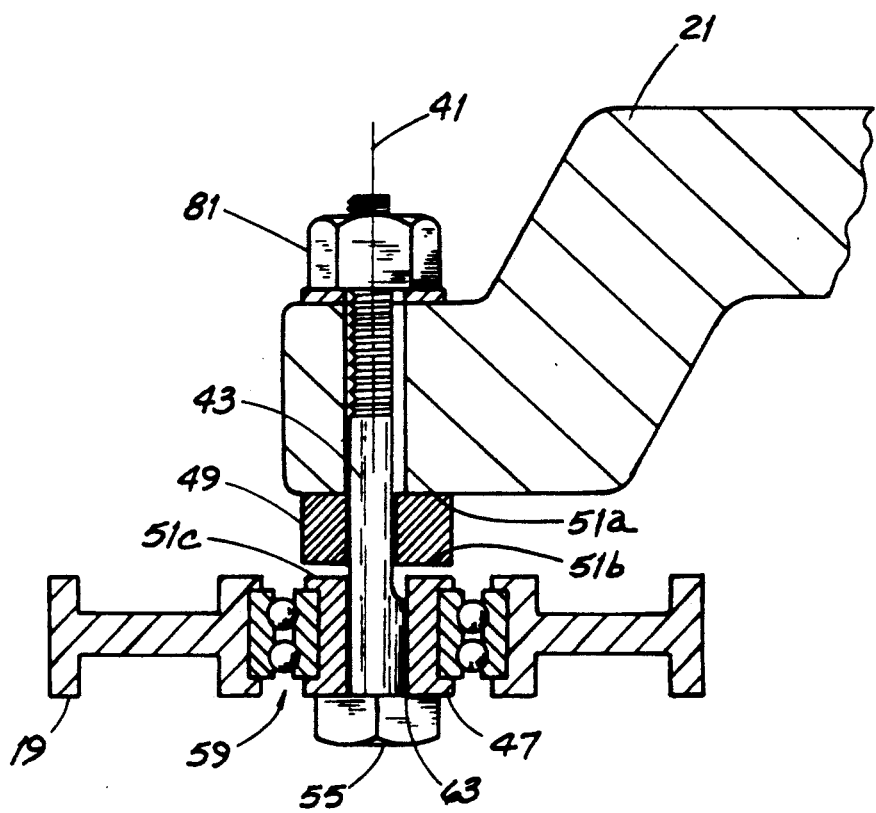
FIG. 4 is a top plan view of a nominal position of the inventive device, taken along the viewing plane 4—4 of FIG. 1, shown in conjunction with the idler pulley and its support arm and with parts broken away and other parts in cross-section.
Figure 6:
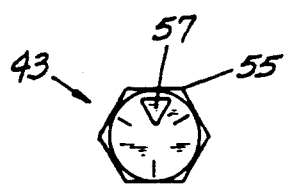
FIG. 6 is an end elevation view of the bolt shown in FIG. 5, taken along the viewing plane 6—6 thereof.
Figure 5:
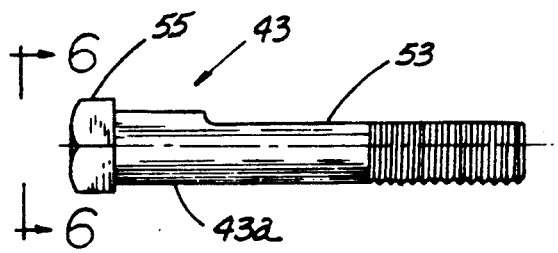
FIG. 5 is a side elevation view of a support shaft embodied as a bolt.
Figure 9A:
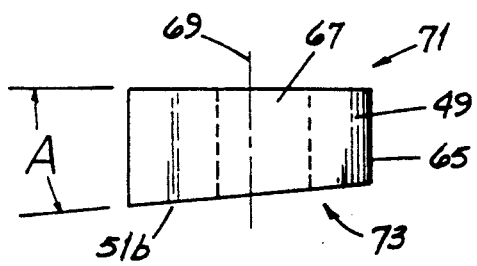
FIG. 9A is a general edge elevation view of the plate shown in FIG. 8, taken along the viewing plane 9—9 thereof, and showing the indexing surface on the outer face of the plate.
Figure 9B:
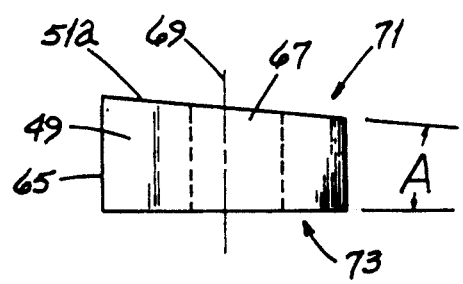
FIG. 9B is an alternate general edge elevation view of the plate shown in FIG. 8, also taken along the viewing plane 9—9 and showing the indexing surface on the inner face of the plate.
Figure 8:
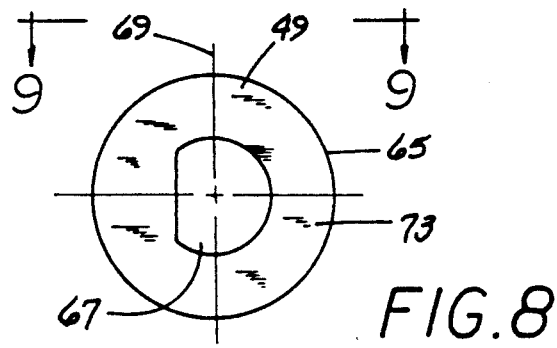
FIG. 8 is an end elevation view of the indexing plate component of the inventive device.

Referring next to FIGS. 4, 5 and 6, the improved device 10 includes a support shaft 43, a collar 47, an indexing plate 49 and an indexing surface 51a, 51b, or 51c. For reasons which will become apparent, only one indexing surface 51a, 51b, 51c is needed and it may be constituted in any one of three locations.

The support shaft 43 has a longitudinal axis 41 with a fixed locus, i.e., one which does not change with changes in the locus of the axis of rotation 39 of the idler pulley 19. In a highly preferred arrangement, the support shaft 43 is embodied as a bolt 43a having a flat surface 53 formed along a portion of its length to provide a torque-transmitting cross-sectional shape. Such cross-sectional shape resembles that of the letter "D" although other torque transmitting shapes, e.g., hexagon or a square may also be used. Such bolt 43a has a hexagon head 55 which bears a marker or symbol 57 designating the position of the flat surface 53.

The collar 47 is mounted on the shaft 43 for supporting the idler pulley 19 which has an axis of rotation 39. The collar 47 is angularly positionable and in one preferred embodiment of FIG. 4, is also part of the inner race of the bearing 59 on which the idler pulley 19 is supported. In another preferred embodiment shown in FIG. 7, the collar is a separate sleeve 61 interposed between the the bearing 59 and the support shaft 43.

Figure 7:
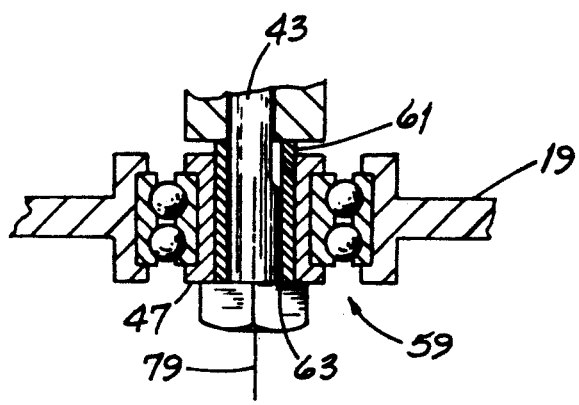
FIG. 7 is a modified embodiment of the inventive device shown in FIG. 4.

For either of the embodiments shown in FIGS. 4 or 7, the diameter of the generally cylindrical hole 63 in the collar 47 is selected to define a slight annular clearance between the collar 47 and the shaft 43. Such clearance permits the collar 47 (and the idler pulley 19 supported thereby) to be "cocked" slightly with respect to the support shaft 43. That is, the clearance permits the locus of the axis of rotation 39 of the idler pulley 19 to be angularly adjusted with respect to the axis 41 of the shaft 43. In the preferred embodiments, the clearance is sufficient to permit such angular adjustment to about 2°.

Referring next to FIGS. 8, 9A, 9B and 10, a highly preferred indexing plate 49 has a generally circular perimeter 65 and an opening 67 therethrough. The opening 67 has a shape (a "D shape in FIG. 8) which generally complements the cross-sectional shape of the support shaft 43. In that way, the indexing plate 49 rotates slightly with incremental rotation of the support shaft 43. The indexing plate 49 has an axis 69 and an inner face 71 and an outer face 73 which define an included angle "A" therebetween of about 2°. In the embodiment shown in FIG. 9A, the indexing surface 51b is constituted on the outer face 73 while in the embodiment shown in FIG. 9B, the indexing surface 51a is constituted on the inner face 71. In those instances where the indexing surface 51a or 51b is constituted on the plate 49, such surface 51a, 51b and the axis of rotation 39 of the pulley 19 define a generally right angle irrespective of the locus of such axis of rotation 39.

Figure 10:
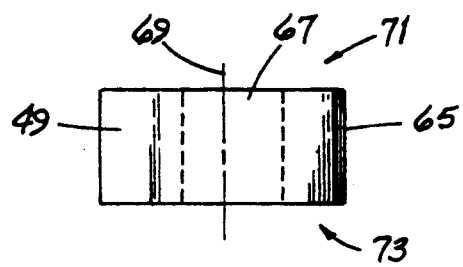
FIG. 10 is another alternate general edge elevation view of the plate shown in FIG. 8, also taken along the viewing plane 9—9 and showing the plate as it appears when the indexing surface is on the collar.
Figure 11:
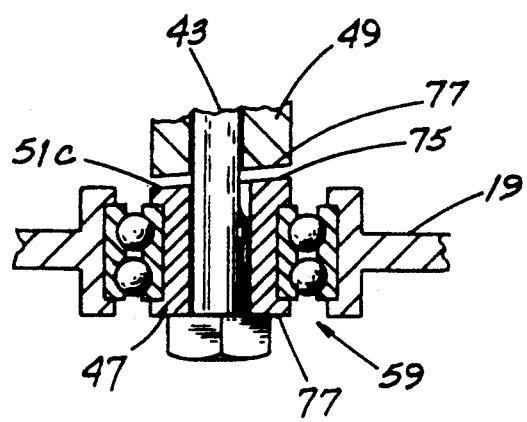
FIG. 11 is an alternate top plan view of the inventive device, similar to FIG. 4, but showing the device wherein the inner face of the collar is constituted as the indexing surface.

Yet another alternate arrangement is shown in FIGS. 10 and 11 wherein the indexing plate 49 has its inner face 71 and outer face 73 parallel to one another and generally normal to the axis 69. In this arrangement, the inner face 75 of the collar is generally planar and defines a relatively small included angle of about 2° with the outer face 77 of the collar 47. That is, the indexing surface 51c is constituted on such inner face and the outer face 75.

In those highly preferred embodiments where the indexing surface 51a or 51b is constituted on either the inner face 71 or the outer face 73, respectively, of the indexing plate 49, the opening 67 in the plate 49 is required to have a shape complementary to that of the support shaft 43. This is so since the rotational position of the plate 49 must change with the changes in the rotated position of the support shaft 43, thereby effecting changes in the angular locus of the axis of rotation 39 of the idler pulley 19. However, in the embodiment in which the plate 49 has parallel faces 71, 73 as shown in FIG. 10 and where the inner face 75 of the collar 47 is slightly angled, the hole 63 in the collar 47 has a torque-transmitting shape which is complementary to that of the support shaft 43. In such embodiment, the flat surface 53 on the shaft 43 extends to the head 55.

It is to be appreciated that the improved device 10 is primarily used to perform a "set up" function when the machine is first placed in operation. When using the improved device 10, it is first assumed that the driven pulley 15 is at the location of the upper dotted outline shown in FIG. 2. To use the device 10 the driving pulley 13 is operated at low speed and in a direction shown by the arrow 35. The user then assumes a position to observe the fact that the center line 45 of the belt 17 is misaligned with respect to the plane 29 defined by the driving pulley 13. The clamping nut 81 (of the prevailing torque type) and the hex head 55 of the shaft 43 are rotated to select that locus of the axis of rotation 39 of the idler pulley 19 which urges the belt 17 in a direction to align its center line 45 with the plane 29 of the driving pulley 13.

While the principles of this invention have been described in connection with specific embodiments, it should be understood clearly that these descriptions are made only by way of example and are not intended to limit the scope of the invention.

What is claimed is:

1. An improved device for maintaining alignment of a belt passing over a idler pulley and driven by a driving pulley, such device including:
   a support shaft mounted on an arm and having an axis with a fixed locus;
   a collar mounted generally concentric with the shaft and supporting an idler pulley having an axis of rotation intersecting the shaft axis at an angle;
   an indexing plate mounted generally concentric with the shaft for maintaining a selected position of the collar;
   an indexing surface in position-affecting relationship to the collar and defining a plane oriented at an angle with respect to the support shaft axis;
   the plate and the collar each being rotationally positionable with respect to the arm and the angle of intersection of the shaft and pulley axes being a function of the relative rotational positions of the plate, the collar, and the arm whereby the locus of the axis of rotation of the idler pulley may be selected to maintain alignment of the belt with the driving pulley.

2. The device of claim 1 wherein the collar has an inner face and wherein the indexing surface is constituted on such inner face.

3. The device of claim 2 wherein the collar has a hole therethrough and wherein the support shaft and the hole are formed to a complementary torque-transmitting shape.

4. The device of claim 1 wherein the indexing plate has an inner face and wherein the indexing surface is constituted on such inner face.

5. The device of claim 4 wherein the indexing plate has an opening therethrough and wherein the support shaft and the indexing plate opening are formed to a complementary torque-transmitting shape.

6. The device of claim 1 wherein the indexing plate has an outer face and wherein the indexing surface is constituted on such outer face.

7. The device of claim 6 wherein the indexing plate has an opening therethrough and wherein the support shaft and the indexing plate opening are formed to a complementary torque-transmitting shape.

8. The device of claim 1 wherein the idler pulley is supported for rotation by a bearing having an inner race and wherein the collar is embodied as such inner race.

9. The device of claim 1 wherein the idler pulley is supported for rotation by a bearing having an inner race and wherein the collar is embodied as a sleeve interposed between the inner race and the support shaft.

10. The device of claim 1 wherein the indexing surface and the axis of rotation of the pulley define a generally right angle irrespective of the locus of such axis of rotation.

11. The device of claim 1 wherein:
    the support shaft is embodied as a bolt having a flat surface formed along a portion of its length to provide a torque-transmitting cross-sectional shape;
    the indexing plate has a generally circular plate perimeter and includes an opening therethrough, such opening having a shape generally complementary to the cross-sectional shape of the bolt;
    such indexing plate further including an inner face and an outer face, such faces being generally planar and defining a relatively small included angle therebetween.

12. The device of claim 11 wherein the inner face is generally normal to the locus of the axis of rotation of the idler pulley.

13. The device of claim 11 wherein the outer face is generally normal to the locus of the axis of rotation of the idler pulley.

14. The device of claim 11 wherein the locus of the axis of rotation of the idler pulley may be selected in a continuum.

15. An improved device for maintaining alignment of a belt passing over an idler pulley and driven by a driving pulley, such device including:
    a support shaft embodied as a bolt having a flat surface formed along a portion of its length to provide a torque transmitting cross-sectional shape, the shaft having an axis with a fixed locus and being rotatably, positionally adjustable about such axis;
    a collar mounted on the shaft for supporting an idler pulley having an axis of rotation, the collar being angularly positionable;
    an indexing plate mounted on the shaft for maintaining a selected angular position of the collar, the plate having a generally circular perimeter and an opening having a shape generally complementary to the cross-sectional shape of the bolt;
    the indexing plate also having generally planar inner and outer faces defining a relatively small included angle therebetween;
    an indexing surface in position-affecting relationship to the collar and defining a plane oriented at an angle with respect to the support shaft axis, whereby the locus of the axis of rotation of the idler pulley may be selected to generally maintain alignment of the belt with the driving pulley.

16. The device of claim 15 wherein the inner face is generally normal to the locus of the axis of rotation of the idler pulley.

17. The device of claim 15 wherein the locus of the axis of rotation of the idler pulley may be selected to a continuum.

* * * * *